May 19, 1953  T. J. GLAZA  2,639,196
COMBINED PIPE LINE SWITCH AND DIVERTER
Filed April 21, 1950  3 Sheets-Sheet 1

Inventor.
Thaddeus J. Glaza.
By Joseph O. Lange
Atty.

May 19, 1953  T. J. GLAZA  2,639,196
COMBINED PIPE LINE SWITCH AND DIVERTER
Filed April 21, 1950  3 Sheets-Sheet 2

Inventor:
Thaddeus J. Glaza.
By Joseph O. Lange
Atty.

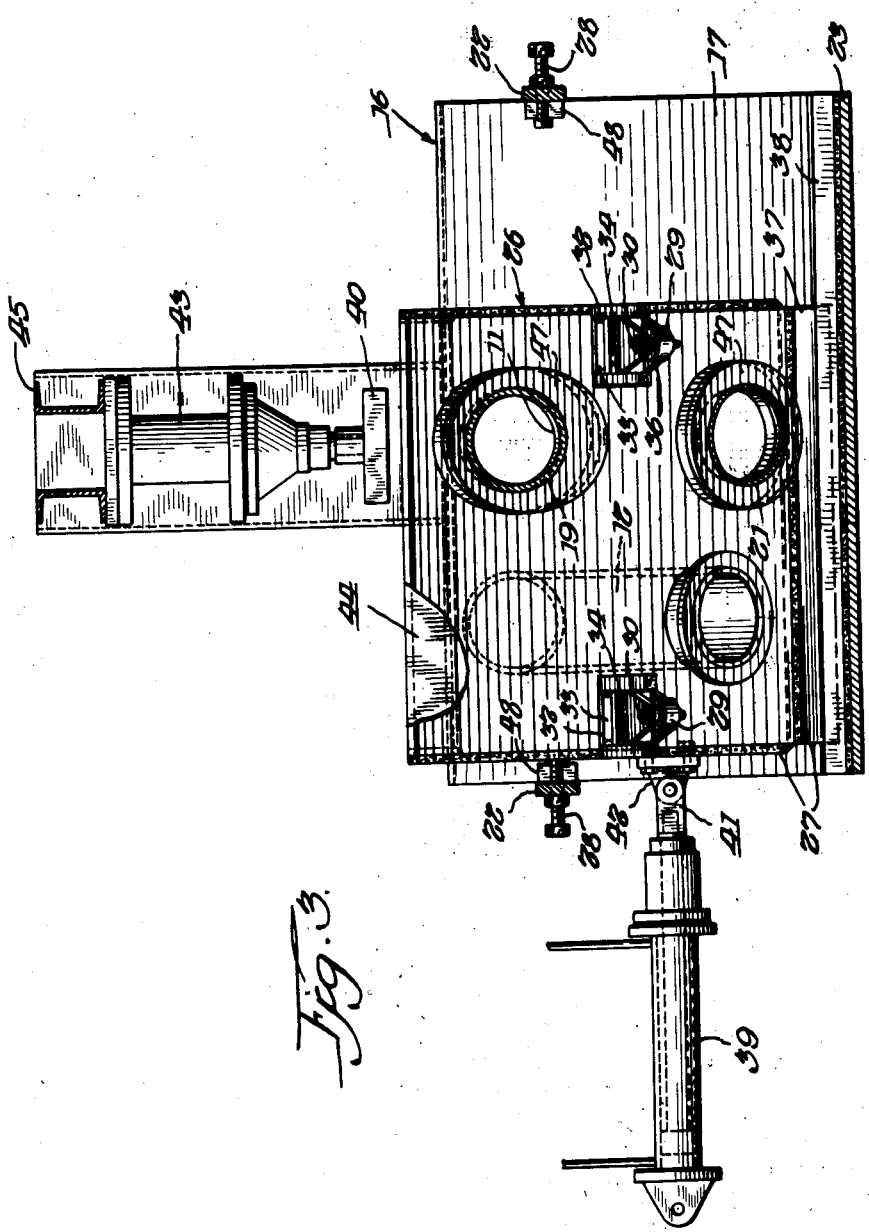

Patented May 19, 1953

2,639,196

UNITED STATES PATENT OFFICE 2,639,196

COMBINED PIPE-LINE SWITCH AND DIVERTER

Thaddeus J. Glaza, Chicago, Ill., assignor to Crane Co., Chicago, Ill., a corporation of Illinois Application April 21, 1950, Serial No. 157,248

5 Claims. (Cl. 302—28)

1

This invention pertains to a combined pipeline switch and diverter, preferably used in conjunction with the transportation of granular or liquid materials, as, for example, sand, flour, grain, syrup, milk, etc. More especially, the invention relates to a diverter or switch which selectively interjects a section or a plurality of sections of pipe into a pipeline system thereby to direct or divert the flow of such materials being carried within the said system as desired in a plurality of paths. The switch of this invention may be conveniently employed, for example, in connection with a pneumatic transportation or conveyor system, such as that disclosed in U. S. Patent application Serial No. 125,712, filed November 5, 1949, of which this applicant is the inventor.

An important object of this invention is to provide a structure to be adaptable with a pipeline or tube line for the purpose of directing the flow of goods of the above mentioned general nature carried by the said line.

Another object of this invention is to avoid the use of a complicated and costly valve system which is sometimes employed to achieve the purpose for which this invention is intended. Also, in valve control of the flow of certain materials, such as those of a granular form, the materials as those referred to may easily prevent the proper functioning of the said valves by clogging the same or exposing the precision parts to severe wear. Also, it is frequently not deemed practical to locate the valves in a position sufficient to allow for complete exhaustion of the materials within the pipe system, as the closed branches of the system will generally retain some deposit of the said materials. Obviously, the result may thereby be the contamination of the material next conveyed if it is one of a different nature than that previously transported. Thus, the pipeline itself may become plugged or blocked because of insufficient line pressure to move the stagnant materials.

Still another object of this invention is to provide a structure for the control of material suitable to flow within a pipeline system and under pressure, which may be easily operated from one suitably located point. This advantage results in a safer system, a saving of manpower, and many other apparent benefits.

Still another object is to provide a structure which operates more rapidly in relation to the present means of accomplishing this result, such as a valve system; and this structure is more economical to manufacture.

2

Other objects and advantages will become more apparent upon proceeding with the following description read in light of the accompanying drawings, in which Fig. 1 is a plan view of a preferred embodiment of the invention.

Fig. 3 is a sectional view taken on the line 3—3 of Fig. 1.

Figure 1:
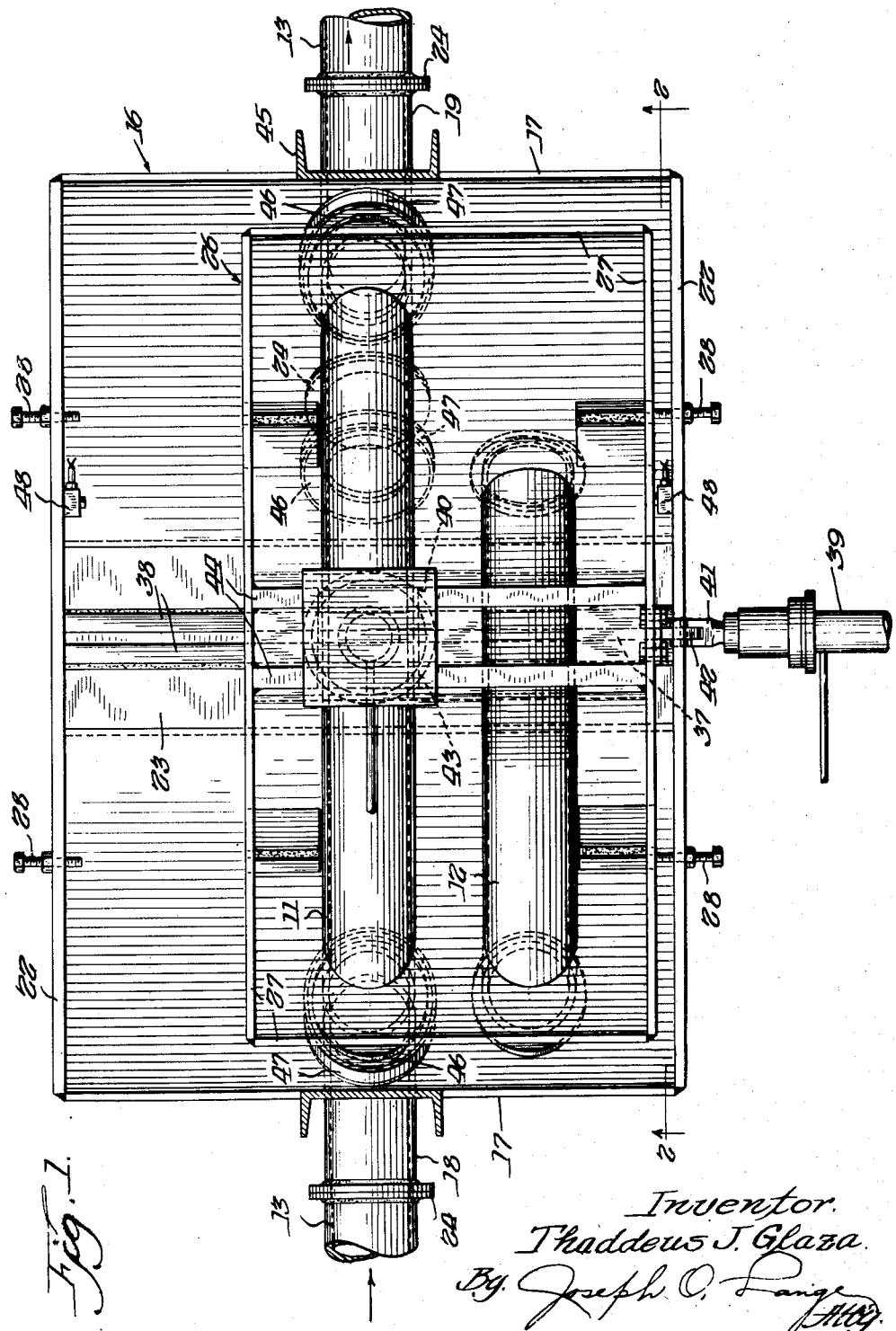
Figure 2:
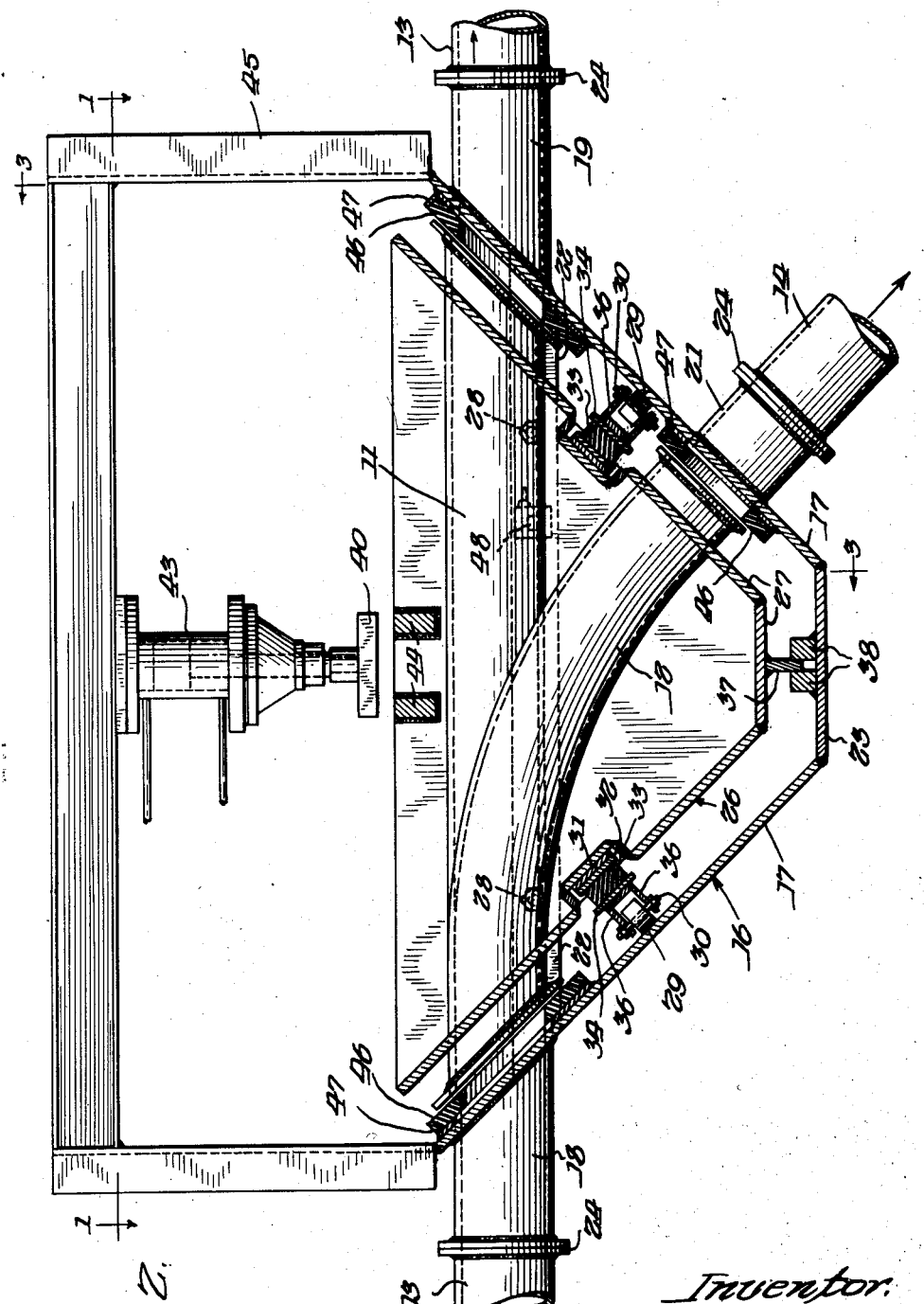
Fig. 2 is a sectional view taken on the line 2—2 of Fig. 1.

As shown in the preferred embodiment of Fig. 2, the novel structure exemplifying this invention consists of a straight section of pipe 11 and a curved section of pipe 12, both suitably mounted to be registrably and separably interposed between the shown end sections of two stationary pipelines 13 and 14 disposed within and constituting a part of a controlled pressure system of the type referred to in the pending patent application. In Fig. 1, the lateral position of the two movable pipe sections 11 and 12 is shown, in which it is indicated that either section 11 and 12 may be selectively aligned with the proper or designated pipeline 13 or 14. Thus, it will be clear that when the straight section 11 is aligned, as shown in Fig. 1, a continuous main pipeline is effected, and when the curved section 12 is aligned with the branch pipeline 14, the material flow will be directed to a particular station (not shown). The number of the abovementioned switches employed is, of course, dependent upon the arrangement, capacity, and the number of stations to be employed. After connecting either of the said pipe sections 11 or 12, the supply pressure is applied to force material of the aforementioned character through the selected pipeline 13 or 14.

Specifically, the above-mentioned result may be accomplished in the general manner defined by the following description. As shown in Fig. 2, a substantially V-shaped stationary base frame 16, includes two plates 17 to form the sides thereof and receive three preferably vertically coplanar pipe sections 18, 19, and 21 suitable to connect with the said pipeline system. Welded to the sides of the frame 16 is a horizontal crossbar 22 at each end of the base frame 16, and a bottom plate 23 to provide support for the frame 16. The three pipe sections 18, 19, and 21 are joined to the respectively extending vertically co-planar pipe ends of the pipelines 13 and 14 by means of suitable flanges 24, thus providing for a simple installation of the device within a pipe system, and also providing for easy replacement of the pipe sections subjected to wear. The inner ends of the pipe sections 18, 19, and 21, which extend through the base frame 16, are preferably provided with inclined faces for the purpose hereinafter described.

To register with the pipe sections 18, 19, and 21, and complete either the pipelines 13 or 14, the straight section of pipe 11 and the curved section of pipe 12 are suitably mounted and supported on the portable carriage 26 which is positioned or cradled for movement within the base frame 16. The carriage 26 is also of substantially V-shape to be operable upon the base frame 16 (as shown in Fig. 2) and consists of plate members 27 on all sides except the top. The width of the carriage 26 is of a dimension which is substantially less than the width of the base frame 16 (see Fig. 1). The said dimension is aproximately equal to the distance between the straight pipe 11 and the curved pipe 12, thereby to provide for full movement of displacement of the carriage 26 between the two frame crossbars 22, preferably provided with four spaced-apart adjustable screw stops 28 which are oppositely disposed and automatically align either one of the pipe sections 11 and 12 desired to be used in the said system. As shown more clearly in Fig. 2, each of the pipe sections 11 and 12 extends through the carriage 26 to communicate individually with the respective pipe sections 18, 19, and 21 of the base frame 16, thereby to selectively complete either the main pipeline 13 for connection with the particular station pipeline 14. The end faces of the sections 11 and 12 are inclined, thereby to register flush with the complementary incline of the faces on the sections 18, 19, and 21 which are in the base frame 16.

The carriage 26 is rendered conveniently portable by means of the four wheels 29 suitably mounted within recesses thereon to sufficiently support and allow the carriage 26 to roll on the base frame 16. A plate 31 and shim 32, which are bolted into the recess, have a live rubber block 33 vulcanized thereto for each of the wheels 29. Another plate 34, vulcanized to the bottom of the rubber block 33, is bolted to a wheel frame 36 which carries a wheel axle 30 for each of the wheels 29. The aforementioned rubber block mounting permits a relatively slight vertical movement of the carriage 26 when the latter is subjected to a suitable force. Other suitable resilient means such as springs (not shown) may be used to yieldingly support the carriage 26. A guide bar 37, welded or otherwise attached to the bottom of the carriage 26, slides, upon the occurrence of the said horizontal displacement of the carriage 26, between two bars 38 welded to the bottom of the base frame.

Any suitable means may be employed for reciprocating the carriage 26. It may be a two-way air cylinder 39, as shown in Fig. 3. A piston rod clevis 41 is pinned to a link 42 which is bolted to the end plate 27 of the carriage 26, thereby transmitting the horizontal motion of cylinder 39 to the carriage 26 thereby to selectively align either pipe section 11 or 12 with its respective pipe members. After the proper alignment of the pipe section has been effected, an air cylinder 43, as in Fig. 2, suitably mounted on a frame 45 in the vertical plane of the base frame pipe sections 18, 19, and 21 and above the carriage 26, is actuated to force downwardly with a plate 40 upon the carriage 26 through two horizontally extending crossbars 44 welded to top portions of the carriage end plates 27, thereby seating the said particular movable pipe section with its proper base frame pipe section in preferably fluid tight relation, as hereinafter referred to.

The inclined faces of the said aligned movable pipe rest on the respective faces of the said base frame pipe, each of which contains a neoprene gasket 46 placed within a gasket plate 47. Thus, the air cylinder 43 applied against the force of the said four rubber blocks, imparts a vertical displacement to the movable pipes 11 and 12 to effect mechanical fluid tight seals with the said respective stationary pipes to provide for the transportation of materials through the said system. It should, of course, be clear that both of the aforementioned air cylinders 39 and 43 may be connected and arranged so as to be remotely controllable.

After using the particularly selected movable pipe section in a desired position to complete the said main or station pipeline, the material supply pressure is turned off and the clamping cylinder 43 is released to allow the carriage 26 to rise slightly due to the expansion of the said four rubber blocks. This movement will thus provide a desirable clearance for the movable pipe sections 11 and 12 when passing the said base frame pipe sections.

To assist in determining which of the movable pipes 11 and 12 is aligned at a particular switch station, and cooperate with the actuating means therefor, a conventionally operating electric switch 48 may be mounted on each of the crossbars 22 in a manner to be influenced and operated by the horizontal end limit movement of the carriage 26 (see Fig. 1). A plurality of the said electric switches may be respectively connected to a panel of indicating lights (not shown) thereby to inform a remotely located operator of the position of each pipe switch station.

Although the invention is shown in only a single preferred embodiment, this is merely for illustrative purposes, and it is not to be so limited. It is susceptible to numerous changes without departing from the spirit thereof, as it is limited only by the scope of the appended claims.

I claim:

1. A pipeline switch for use in a selectively discontinuous pipe system having a main line and a branch line, the switch comprising two sections of movable pipe suitable for predetermined alternate movement to be separately interposed into the said pipe system thereby to complete either the said main line or the branch line, a stationary base frame having conduit means for predetermined registry with said movable pipe sections, carriage means operable on the said base frame for mounting the said movable pipe sections, and means for reciprocally moving the said carriage means on said base frame for selectively positioning one of the said movable pipe sections to communicate with either the said corresponding main line or branch line thereby to effect a continuous pipeline along the said selected line.

2. A pipeline switch for use in a divided pipe system having a main line and a branch line, the combination including two sections of movable pipe transversely movable to the direction of the longitudinal axis of the divided pipe system and arranged to be predeterminately interposed into the pipe system thereby to complete selectively either the said main line or the said branch line, carriage means resiliently mounted for supporting the said movable pipe sections, a base frame to receive and support said carriage means and means for moving the said carriage means for transversely positioning one of the said movable pipe sections to communicate with either the said main line or branch line thereby to effect a continuous pipeline along the line selected, means for compressing the resilient mounting of the said carriage means concurrently with said positioning of the movable pipe sections whereby to draw said carriage means closer to said frame.

3. A pipeline switch device comprising separated pipes with inclined face ends, a base frame therefor to receive said inclined face ends of the said separated pipes, a carriage positioned to reciprocate on the said base frame, means for reciprocally moving the said carriage, a plurality of pipe sections mounted on the said carriage and suitably formed to align predeterminately with the said respective separated pipes, independent means for seating the said aligned pipe sections with the said separated pipes to thereby complete a pipeline, resilient means interposed between said carriage and the base frame, the said resilient means being mounted to permit the said frame and carriage to be drawn together against the bias of the said resilient means when the aligned pipe sections are seated to effect a pipeline connection therebetween.

4. A pipline switch for use in a selectively discontinuous pipe system having a main line and a branch line, the switch comprising two sections of movable pipe suitable for predetermined alternate movement to be separately interposed into the said pipe system thereby to complete either the said main line or the said branch line, a stationary base frame of substantially V-section, carrying means nested with the V-portion of said base frame for mounting the said movable pipe sections, and means within said frame for moving the said carriage means transversely to the main line and branch line for selectively positioning one of the said movable pipe sections to communicate with either the said corresponding main line or branch line thereby to effect a continuous pipeline along the said selected line, the said carriage means having supporting non-friction means resiliently mounted to permit drawing the said carriage means closer to the frame after contacting the latter member and against the bias of the resilient mounting when the said pipeline communication is being effected.

5. A pipeline switch device comprising separated pipes with inclined face ends, a base frame therefor to receive said inclined face ends of the said separated pipes, a carriage positioned to reciprocate on the said base frame, means for reciprocally moving the said carriage, a plurality of pipe sections mounted on the said carriage and suitably shaped to align predeterminately with the said respective separated pipes, independent means for seating the said aligned pipe sections with the said separated pipes to thereby complete a pipeline, resiliently mounted non-friction means interposed between said carriage and base frame, the said seating of the aligned pipe sections with the separated pipes including resilient annular members therefor adjacent the ends of the aligned and separated pipes and pipe sections whereby upon initial actuation of said independent means the said non-friction means are compressed and upon continued actuation and movement of the said carriage toward the said base frame the resilient annular members are compressed by an end portion of the pipes carried by the said carriage.

THADDEUS J. GLAZA.

References Cited in the file of this patent

UNITED STATES PATENTS

| Number | Name | Date |
|---|---|---|
| 1,238,047 | Ogden | Aug. 21, 1917 |
| 1,538,027 | Cushing | May 19, 1925 |
| 2,140,128 | Craggs | Dec. 13, 1938 |
| 2,177,301 | Kyes | Oct. 24, 1939 |
| 2,195,407 | Craggs | Apr. 2, 1940 |
| 2,434,435 | Reibel | Jan. 13, 1948 |